United States Patent

[11] 3,633,980

[72] Inventors James E. Hunt
Lansdale;
Rene L. Guerster, Maple Glen, both of Pa.
[21] Appl. No. 28,812
[22] Filed Apr. 15, 1970
[45] Patented Jan. 11, 1972
[73] Assignee Ametek Inc.
New York, N.Y.

[54] SUPPORT BEARING
2 Claims, 6 Drawing Figs.
[52] U.S. Cl................................................... 308/6 R,
188/134
[51] Int. Cl...................................................... F16c 1/28,
B60t 7/12
[50] Field of Search............................................ 308/6;
188/134, 135, 136

[56] References Cited
UNITED STATES PATENTS
| | | | |
|---|---|---|---|
| 3,410,615 | 11/1968 | Bieber............................. | 308/6 |
| 2,253,820 | 8/1941 | Spiro.............................. | 308/6 X |
| 2,265,086 | 12/1941 | Spiro.............................. | 308/6 X |
| 3,467,329 | 9/1969 | Giltner........................... | 242/54 R |

*Primary Examiner*—Martin P. Schwadron
*Assistant Examiner*—Barry Grossman
*Attorney*—Smith, Harding, Earley & Follmer ABSTRACT: A bearing for supporting a telescoping helical spiral tube device against lateral movement comprises a plurality of rollers adapted to engage the outer periphery of the tube. The rollers are interconnected with brake means main become operative to prevent radial movement of any roller except when all of the rollers are equally displaced from the axis of the tube. Thus, the bearing allows expansion and contraction of the tube as it is extended and withdrawn, but positively prevents lateral displacement of the tube.

INVENTORS
JAMES E. HUNT &
RENE L. GUERSTER
BY
Smith, Harding, Earley & Follmer
ATTORNEYS

INVENTORS
JAMES E. HUNT &
RENE L. GUERSTER
ATTORNEYS

SUPPORT BEARING

BACKGROUND OF THE INVENTION

This invention relates to support bearings for self-erecting spiral tubes employing helical, axially extending ribbon springs. A tube of this type is disclosed in U.S. Pat. No. 3,467,329, issued Sept. 16, 1969 to Charles M. Giltner. Briefly, the structure disclosed in the Giltner patent consists of a base, on which there is mounted a winding drum and a guide pin disposed at an angle with respect to the axis of rotation of the drum. The ribbon spring, a noncumulative force ribbon, forms a telescoping tube. The guide pin extends into the lower end of the telescoping tube. An end of the ribbon is attached to the winding drum, and the ribbon can be wound onto the winding drum from the guide pin to withdraw the tube. The tube can be extended by allowing the winding drum to rotate in the opposite direction.

In a device of the type disclosed in the Giltner patent, some means must be provided to support the tube against lateral movement while it is in a fully or partially extended condition. Giltner accomplished this by providing a guide sleeve surrounding the spiral tube at a location a short distance away from the base. A sleeve, however, must have an internal diameter such as to allow a clearance accommodating variations in tube diameter. Consequently, it necessarily allows the partially extended spiral tube to sway back and forth to some degree.

U.S. Pat. No. 3,410,615, issued Nov. 12, 1968 to William J. Bieber, discloses one approach toward solving the problem of swaying. Instead of using a sleeve, Bieber provided a support bearing having a plurality of guide rollers held in engagement with the spiral tube by individual springs. The guide rollers were interconnected through gearing in such a way as to allow radial expansion of the spiral tube readily as it was extended. Any tendency of the spiral tube to sway, however, would push one or more of the guide rollers outwardly. The other guide rollers would also move outwardly because of the gearing, and the force of all of the springs would be reflected through the gearing to the guide rollers being pushed outwardly by the spiral tube. Thus, a large restoring force was imparted to the spiral tube through the guide rollers which the swaying spiral tube has pushed.

In some applications of spiral tube devices, lateral loadings are encountered which cannot be accommodated adequately by the accumulation of the forces of several springs as accomplished by the Bieber apparatus.

SUMMARY OF THE INVENTION

In accordance with this invention, radial expansion and contraction of the spiral tube is allowed by a set of guide rollers, but the spiral tube is positively locked against lateral movement by braking devices which become operative when differential movement of the guide rollers takes place.

The principal object of this invention, therefore, is to provide a support bearing which positively locks a telescoping spiral tube against lateral displacement while it readily allows radial expansion and contraction of the spiral tube.

Another object is to maintain support of a spiral tube through a wide range of variation in its diameter.

Other objects will be apparent from the following description when read in conjunction with the accompanying drawings.

DESCRIPTION OF THE PREFERRED EMBODIMENT

Figure 1:
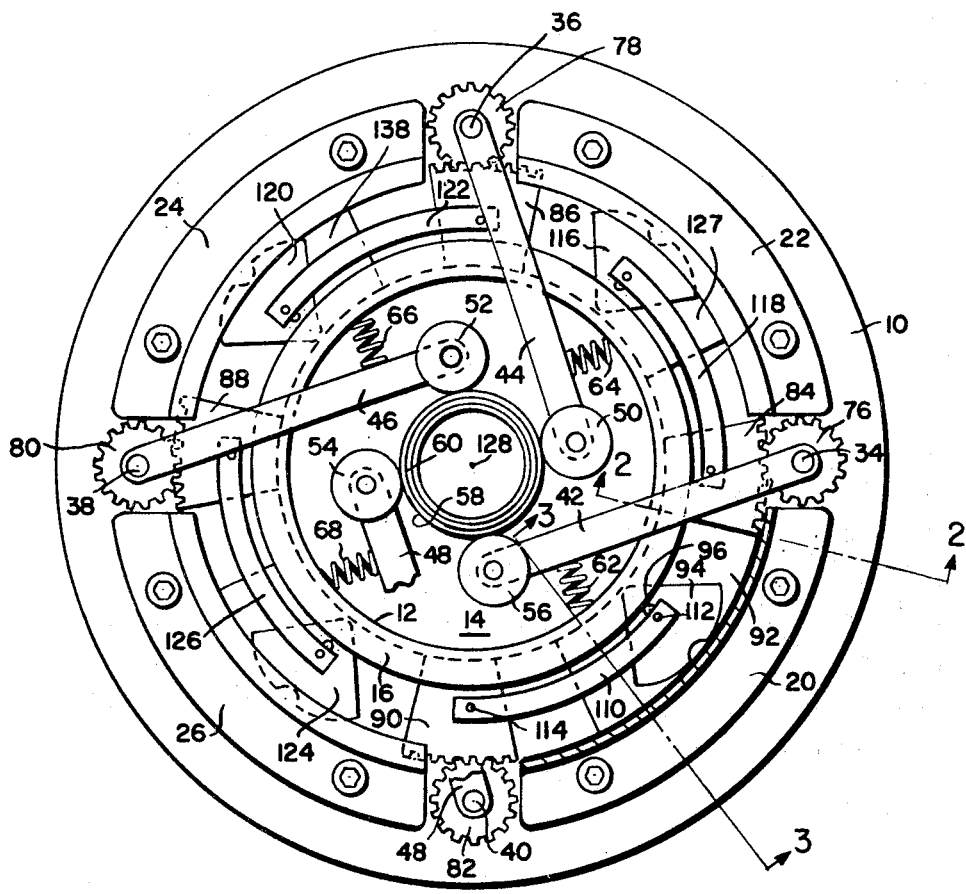
FIG. 1 is a plan view, partially in section, showing the support bearing in engagement with a spiral tube in a centered condition.
Figure 2:
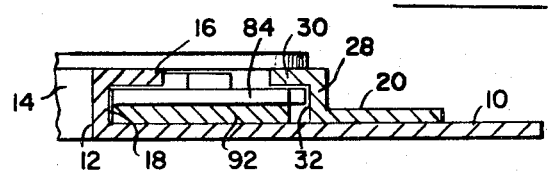
FIG. 2 is a vertical section taken on the plane 2—2 indicated in FIG. 1.
Figure 3:
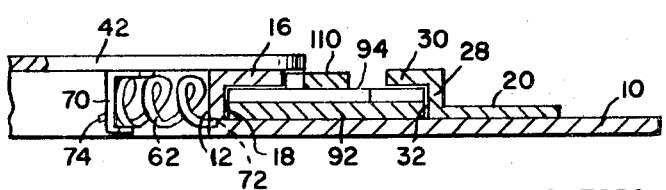
FIG. 3 is a vertical section taken on the plane 3—3 indicated in FIG. 1.

Referring to FIGS. 1, 2 and 3, an annular frame 10 is shown, having, at its inner periphery, a cylindrical boss 12 defining a circular central opening 14. An overhanging annular member 16, integral with boss 12, forms an outwardly open, circular slot 18 (FIGS. 2 and 3), which acts as a guide for certain moving parts to be described subsequently. An outer guide consisting of four segments 20, 22, 24 and 26 is provided to cooperate with guide slot 18. These segments are bolted to the circular frame. As seen in FIGS. 2 and 3, guide 20 includes a vertical member 28 and an overhanging member 30 forming an inwardly facing surface 32. Each of the other segments 22, 24 and 26 is identical to segment 20.

Between the ends of the various segments 20, 22, 24 and 26, shafts 34, 36, 38 and 40 are mounted in bearings (not shown). Arm 42 is fixed to shaft 34 so that it is pivoted for rotation about the axis of shaft 34. Arms 44, 46 and 48 are similarly mounted on shafts 36, 38 and 40 respectively. Rollers 50, 52, 54 and 56 are respectively mounted at the inner ends of arms 42, 44, 46 and 48. These rollers are freely rotatable. They are held in contact with the outer periphery 58 of spiral tube 60 by springs 62, 64, 66 and 68. These springs are held in compression between cylindrical boss 12 and brackets fastened underneath the respective arms. One such bracket is indicated at 70 in FIG. 3. There, spring 62 is shown held between bracket 70 and boss 12. A hole 72 is provided in boss 12 to receive an end of spring 62. End 74 of spring 62 is held in a hole (not shown) in bracket 70. Pinions 76, 78, 80 and 82 are fixedly mounted on the respective shafts 34, 36, 38 and 40 for rotation therewith.

The pinions are respectively in mesh with gear segments 84, 86, 88 and 90. As shown in FIGS. 1 and 2, gear segment 84 is fastened to the top of a segment-shaped plate 92. Also fastened to the top of plate 92 is a braking member or "sprag" 94. Braking member 94 is pivoted on pin 96 to plate 92 for rotation about the pin. The assembly of plate 92, gear segment 84 and braking member 94 is held between guide slots 18 and 32, and is slidable in a circular path defined by the guide slots. Three similar assemblies are provided, one being associated with each of pinions 78, 80 and 82.

Figure 4:
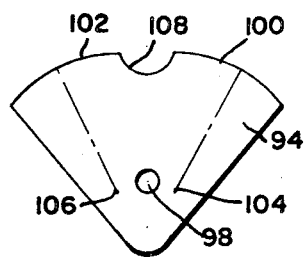
FIG. 4 is a plan view of one of the braking devices.

FIG. 4 shows braking member 94 in detail. Member 94 consists of a wedge-shaped unitary piece of metal having a hole at 98 for receiving pivot pin 96 (FIG. 1). Two circular surfaces 100 and 102 are provided being respectively centered at 104 and 106. Surfaces 100 and 102 are separated from each other by a notch 108. One of these two surfaces will engage the inwardly facing surface of of vertical member 28 (FIG. 3) if the braking member is rotated one way or the other, about pin 96, out of symmetrical relationship with the radius of the entire assembly which passes through the center of pin 96.

The linkage which effects rotation of the braking members in response to differential movement of the rollers will now be described. Referring to FIG. 1, a link 110 is connected by pin 112 to the face of braking member 94 at a point such that a pull exerted by link 110 will effect clockwise rotation of the braking member about the pivot pin 96. The opposite end of the link is connected by pin 114 to gear segment 90, which is associated with arm 48 through pinion 82. Arm 42 is similarly associated with a braking member 116, identical with braking member 94, through a link 118. Arm 44 is associated with another identical braking member 120 through a link 122. Arm 46 is associated with still another identical braking member 124 through link 126. Thus, each of the arms is associated which is operatively connected to a next adjacent arm through gearing.

If the spiral tube 60 expands or contracts uniformly, that is, in such a way that all points on its outer periphery 58 are equidistant from axis 128, the movement of rollers 50, 52, 54 and 56 will be identical. The braking members 94, 116, 120 and 124 will remain in symmetrical relationship to the radii passing through their mounting pins, and will not come into braking contact with the inwardly facing surfaces of the vertical parts of the segment-shaped outer guide members to effect braking.

Figure 6:
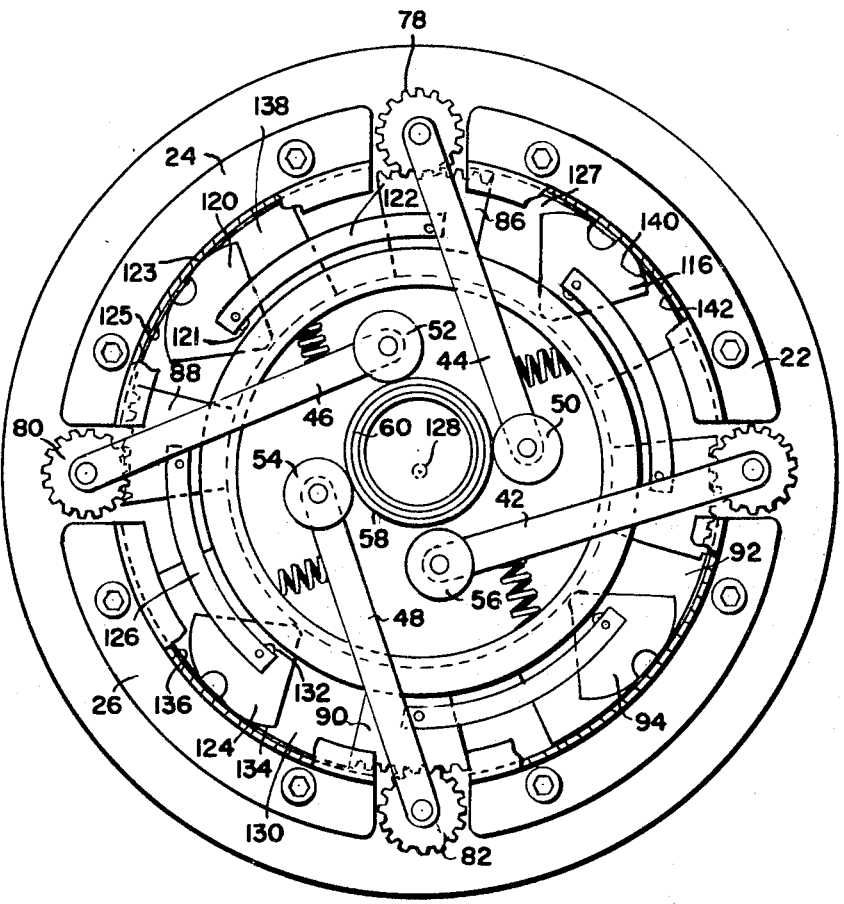
FIG. 6 is a plan view of the support bearing shown in engagement with a spiral tube in a laterally displaced condition.
Figure 5:
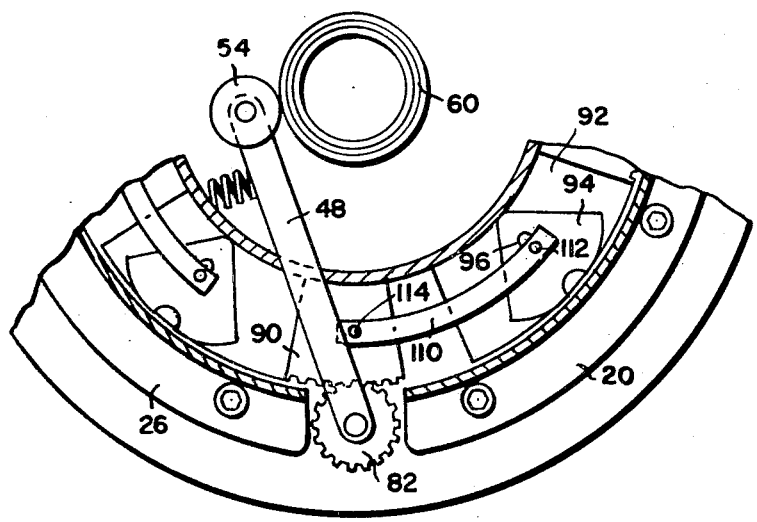
FIG. 5 is a fragmentary sectional view showing the details of a linkage connecting one of the guide rollers to one of the braking devices.

Reference should now be made to FIG. 6. There, spiral tube 60 is shown in a laterally displaced condition with respect to axis 128. It has caused the laterally outward displacement of roller 52. (The rollers, of course, move circumferentially as well as radially because of the manner in which they are mounted.) Rollers 54 and 50 have moved inwardly, but their movement has been negligible. It is the differential movement of rollers 52 and 50 which is critical. Plate 127 remains stationary because of its connection to roller 50 through gear segment 86, pinion 78 and arm 44. The result of the differential movement of rollers 52 and 50 is the clockwise movement of plate 138 and counterclockwise rotation of braking member 120 about its pivot pin 121 under the action of link 122, which remains stationary. This brings surface 123 of braking member 120 into contact with the inwardly facing surface 125 of segment 24. The friction and "camming" resulting from this contact prevent further clockwise movement of segment-shaped plate 138, and prevent further outward movement of roller 52, thus restraining the spiral tube against further lateral movement in the direction toward roller 52. As the push on link 122 becomes stronger, the force with which braking surface 123 contacts surface 125 increases. The displacement of spiral tube 60 with respect to axis 128 has been somewhat exaggerated in the drawing to illustrate the operation of the device. In practice, the tolerances of the braking members and the inwardly facing surfaces with which they cooperate can be made so fine as to allow only the slightest tilting of the spiral tube.

It will be noted that braking member 124 is tilted slightly clockwise. This is because the segment-shaped plate 138, on which gear segment 88 is mounted, has moved some distance in the clockwise direction while segment-shaped plate 130 has not moved. However, this rotation of braking member 124 has no significance.

Braking member 116 is tilted in a counterclockwise direction so that its braking surface 140 is in frictional contact with the inwardly facing surface 142 of segment-shaped outer guide member 22. This rotation of brake member 116 resulted from the clockwise rotation of arm 42 allowed by the movement of spiral tube 50. It will be noted that braking member 116 holds roller 56 separated from the outer periphery 58 of spiral tube 60, but this has no significance. Braking member 94 is tilted slightly in a clockwise direction as a result of the counterclockwise movement of segment-shaped plate 92 allowed by the clockwise movement of arm 42. This rotation provides for a braking and "camming" effect which prevents further inward movement of roller 56. It will be apparent that lateral movement of the spiral tube in any direction will effect a braking action of at least one of the braking members, stopping the spiral tube from further lateral movement.

If the spiral tube is laterally displaced in a direction such that two of the rollers are moved outwardly, a somewhat different braking action takes place. Referring to FIG. 1, if the spiral tube were laterally displaced in such a way as to move rollers 52 and 50 outwardly, rollers 54 and 56 would be allowed to move inwardly under the influence of their springs. Inward movement of roller 54 effects counterclockwise movement of the segment which carries braking member 124, while outward movement of roller 52 effects clockwise movement of link 126.

Similarly, inward movement of roller 56 affects a counterclockwise movement of link 118, while outward movement of roller 50 effects a clockwise movement of the segment carrying braking member 116. This combination of movements causes braking member 116 to tilt in a counterclockwise direction effecting a braking action preventing further outward movement of roller 50. When braking member 116 tilts, it effects braking of segment 127. Link 122 stops moving. Further movement of segment 138 in a clockwise direction effects braking and camming of surface 123 against surface 125, locking segment 138 and preventing further outward movement of roller 52. Rollers 50 and 52 are therefore simultaneously locked against outward movement.

In the apparatus described, the braking action takes place because the tilting of the braking members produces a radial expansion of the members sliding between the slot-defining members 28 and 12. It will be apparent that other braking systems can be used in place of the specific braking system disclosed.

Various modifications can be made to the apparatus described. For example, the number of rollers can be increased or decreased. The support bearing may be used to support expansible members other than spiral tubes.

We claim:

1. A support bearing for preventing lateral displacement of an expansible member with respect to an axis while allowing radial expansion and contraction about said axis comprising:
   a frame having a central opening,
   a plurality of rack means mounted on said frame about said opening,
   a sprag pivotally mounted on each rack means,
   a member fixedly secured to the frame adjacent each sprag,
   connecting means pivoted to each sprag and connected to the next adjacent rack means,
   a gear adjacent each rack means in engagement therewith and mounted for rotation about a fixed axis, and
   a plurality of levers each having one end connected to a gear for the rotation thereof and the other end attached to engage and follow the outer periphery of the expansible member,
   relative movement of adjacent rack means due to lateral displacement of the expansible member causing a sprag to pivot and engage its adjacent member to arrest the movement of the rack to which its connected and the associated gear and lever.

2. A support bearing according to claim 1 having resilient means to bias each of said plurality of levers into engagement with said expansible members.

* * * * *